May 26, 1964 R. MONELLI 3,134,843
JOINTS FOR ELECTRIC CABLES HAVING ANTI-TORSIONAL ARMOUR
Filed Aug. 30, 1960
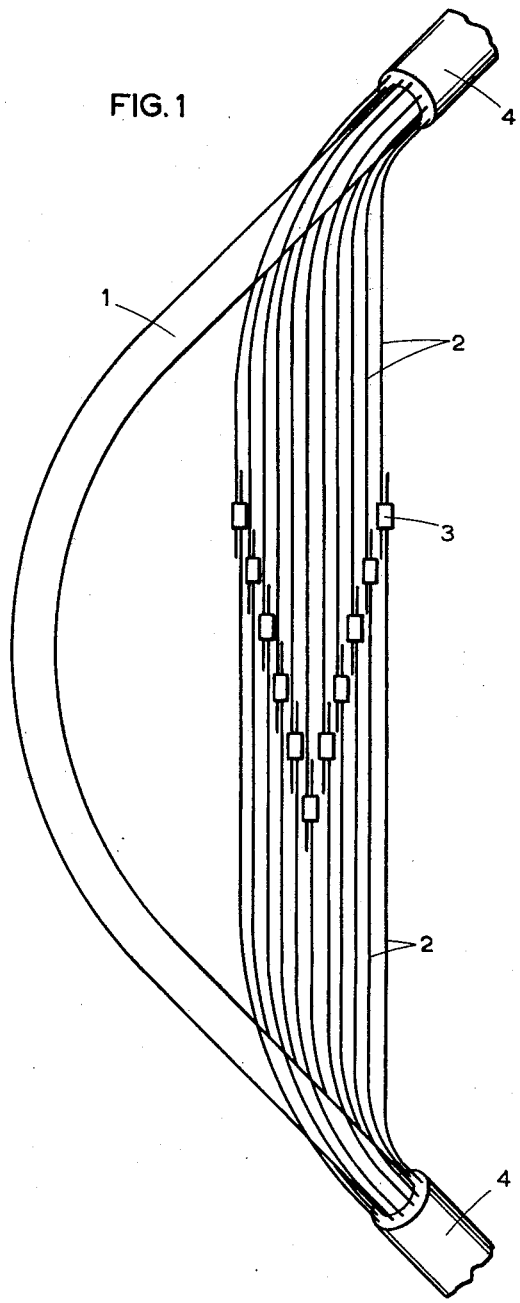
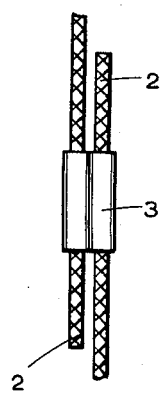
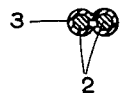
Riccardo Monelli
INVENTOR
by Eugene E. Stevens
ATTORNEY

United States Patent Office 3,134,843
Patented May 26, 1964

3,134,843
JOINTS FOR ELECTRIC CABLES HAVING ANTI-TORSIONAL ARMOUR
Riccardo Monelli, Milan, Italy, assignor to Pirelli Societa per Azioni, Milan, Italy
Filed Aug. 30, 1960, Ser. No. 52,959
Claims priority, application Italy Sept. 2, 1959
3 Claims. (Cl. 174—88)

The present invention relates to joints for electric cables of the type having anti-torsional armour constituted by metallic strands which are parallel to one another and to the axis of the cable and are embedded in a sheath of thermoplastic material.

In cables having a conventional armour formed by a layer of wires applied in the form of a helix, the joining of the armour of two cable ends is termed "splicing". This splicing consists in braiding or interlacing with one another end portions of the armouring wires of the two cable lengths to be joined; and thereafter placing tight transverse bindings about the announcing wire assembly. The tensile stress is therefore transmitted between the two joined wire-provided armours, on account of the friction arising between the wires, both through the effect of the braidings and by reason of the pressure exerted by the armour-surrounding bindings. However, with the parallel strand type of cables having anti-torsional armour, it is not possible to adopt a similar procedure because of the difference in construction. In fact, considering a cross-section of the parallel armour strand cable, the individual strands may be disposed along a circumference in such manner as not to be in contact with one another, since the thermoplastic material in which they are embedded holds them in position. Therefore, by removing the said thermoplastic material at the terminal cable portions so as to bare the strands and by braiding the latter, sufficient friction is not obtained to ensure satisfactory splicing.

On the other hand, in view of the fact that each parallel armouring strand is formed by several wires, it is possible to connect each strand of one cable length to the corresponding strand of the other cable length by splicing. However, in such case it is necessary, when the splicing operation has been completed, that all the strands, shall be of exactly the same length so that the tensile stress is distributed uniformly over the various strands as joined, a condition which is very difficult to obtain in practice in actual industrial production.

According to the present invention, in an electric cable having anti-torsional parallel strand-providing armour of the type set forth, the joining of the individual armour strands is effected by means of sleeve couplings deformed permanently by compressing or squeezing same around said individual strands. This procedure is effective in obtaining absolute equality of length of all the individual strands when lengths of same are joined together.

In the drawing,

FIG. 1 is a side elevational view of a portion of a cable after its core has been joined and after the individual armouring strands have been joined;

FIG. 2 is a detail elevational view showing an initial step in connecting two armouring strand lengths; and FIG. 3 is a cross-sectional view through strands of FIG. 2, and the connecting sleeve.

The method of cable length joining according to the present invention is illustrated diagrammatically, by way of example, in FIGURE 1 of the accompanying drawing; FIGURES 2 and 3 illustrate on a larger scale the joining of a single pair of strands.

Referring to FIG. 1, this view shows an intermediate step in the novel method of producing the novel cable joint. Thus, as will be understood, the sheath of thermoplastic material 4 has previously been removed from end portions of two cable lengths and the thus exposed cores 1 and freed corresponding armour strands 2 connected.

In carrying out the invention, the cores 1 of the respective cable lengths are first joined by any method already known in the art. That length of cable comprising the now joined core is then bent to an arc (exaggerated for the purposes of clarity in FIGURE 1), while the strands 2 to be joined are disposed along a chord of the said arc.

Each strand 2 in one cable length is then connected to the corresponding strand in the other cable length by means of a longitudinally split sleeve coupling 3, shown more particularly in FIGURES 2 and 3. Each sleeve 3 is squeezed or compressed around its strands sufficiently to withstand, without sliding, a tension which is a proportion only, for example, one tenth, of the breaking load of the strands, whereby, on the application of tensile stress above that proportion, sliding of the strands through the sleeve coupling will occur. The joints of the various strands 2 are preferably disposed so as to be suitably staggered in a lengthwise direction as indicated in FIG. 1.

The cable lengths as thus far joined are then subjected to tensile stress to cause them, together with the joint of core 1, to lie in a straight line. To accomplish this, it is necessary for the applied stress to be sufficient, as aforementioned (but below strand-load capacity) to cause all the strands 2 to slide in their partially clamped respective couplings 3. The strand-sliding tension chosen is such as not to cause appreciable elongation of the individual strands, while being sufficient to stretch all of them uniformly over the short exposed and now functionally integral core of the joined cable sections, and said tension is preferably applied with the cable in a vertical position.

The desired relative positions of the strands 2 having thus been obtained, the tensile stress is removed and the core 1 is bent again, as in FIG. 1, so that the strands become slack, further sliding of the strands in their couplings 3 being avoided. All the couplings 3 are then tightly clamped around their strands. The cable is finally straightened and, while maintaining it under slight tension, the sheath is restored all round the connected strands 2 by the technique known in the art.

The cable joint described does not constitute a weak point of the armour, but a point of greater strength, inasmuch as, since the strands are superposed, the cross-section of metal is doubled at each coupling.

What I claim and desire to secure by Letters Patent in the United States is:

1. A joint for electric cables having anti-torsional armour comprising a sheath of thermoplastic material enclosing a layer of metallic strands which are disposed parallel to one another and to the axis of the cable, and wherein each of the individual armour strands of one of two cable lengths is joined to the corresponding individual armour strand of the other cable length by means of at least one coupling sleeve which fixedly and compressingly engages around the said related strands.

2. A method of forming a joint for electric cables having anti-torsional armour comprising a sheath of thermoplastic material enclosing a layer of metallic cores, including the following steps: removing the thermoplastic material from the ends of each cable length to be joined so that the metallic strands are freed and the cores of the cable lengths are bared, joining the said cores in any suitable manner, bending the portion of cable comprising the joined cores to an arc, disposing the strands to be joined along a chord of the said arc, connecting each strand in one cable length to the corresponding strand in the other length by means of a sleeve coupling compressed around the said two strands sufficiently to withstand, without sliding, a tension which is a proportion only of the breaking load of the strands, whereby, on the application of tensile stress above the said proportion, sliding of the strands through the related sleeve will occur, subjecting the cable lengths as thus far joined to tensile stress sufficient to cause them, together with the joined cores, to lie in a straight line, the strands, under said tensile stress, sliding in their partially clamped respective couplings, removing the aforementioned tensile stress and bending the core again so that the strands become slack, but said last bending being insufficient to result in further sliding of the strands in their couplings being avoided, tightly clamping all the couplings around their strands and thereafter straightening the cable and, while maintaining the cable under slight tension, restoring the sheath of thermoplastic material all around the joined strands in any suitable manner.

3. The method as set forth in claim 2, and wherein end portions of each of the respective strands to be connected together are longitudinally lapped against one another prior to application of the related sleeve coupling thereto.

References Cited in the file of this patent
UNITED STATES PATENTS
2,810,010  Davey ------------------ Oct. 15, 1957